(12) United States Patent
Ide (10) Patent No.: US 11,990,852 B2
(45) Date of Patent: May 21, 2024

(54) CONTROL DEVICE FOR ELECTRIC MOTOR

(71) Applicant: KABUSHIKI KAISHA TOYOTA JIDOSHOKKI, Kariya (JP)

(72) Inventor: Akira Ide, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 171 days.

(21) Appl. No.: 17/783,789

(22) PCT Filed: Nov. 19, 2020

(86) PCT No.: PCT/JP2020/043160
§ 371 (c)(1),
(2) Date: Jun. 9, 2022

(87) PCT Pub. No.: WO2021/117453
PCT Pub. Date: Jun. 17, 2021

(65) Prior Publication Data
US 2023/0011035 A1   Jan. 12, 2023

(30) Foreign Application Priority Data

Dec. 13, 2019 (JP) ................................ 2019-225345

(51) Int. Cl.
*H02P 21/22* (2016.01)
(52) U.S. Cl.
CPC ..................... *H02P 21/22* (2016.02)

(58) Field of Classification Search
CPC ............................... H02P 21/22; H02P 27/085
USPC ............................. 318/400.02, 400.01, 700
See application file for complete search history.

(56) References Cited

U.S. PATENT DOCUMENTS 10,461,681 B2 * 10/2019 Irie ...................... H02P 27/08

FOREIGN PATENT DOCUMENTS

JP     2015-126641 A    7/2015

* cited by examiner

*Primary Examiner* — David Luo
(74) *Attorney, Agent, or Firm* — Sughrue Mion, PLLC (57) ABSTRACT

A control device for an electric motor includes an inverter circuit; and a control circuit that finds a voltage command value such that the d-axis current and the q-axis current approach a d-axis current command value and a q-axis current command value, and turns the plurality of switching elements on and off by using a drive signal in accordance with a result of comparison between the voltage command value and a carrier wave. The control circuit corrects the voltage command value by using a polarity of the alternating current during dead time, and causes the d-axis current command value in a certain length of time before and after the alternating current reaches zero to be greater than the d-axis current command value in a length of time other than the certain length of time.

2 Claims, 3 Drawing Sheets

CONTROL DEVICE FOR ELECTRIC MOTOR

CROSS REFERENCE TO RELATED APPLICATION

This application is a National Stage of International Application No. PCT/JP2020/043160 filed Nov. 19, 2020, claiming priority based on Japanese Patent Applications No. 2019-225345 filed Dec. 13, 2019, the contents of all of which are incorporated herein by reference in their entirety.

TECHNICAL FIELD

The present disclosure relates to a control device for an electric motor.

BACKGROUND ART

As a control device for an electric motor, there is a control device that controls the driving of the electric motor by converting alternating currents that flow through the electric motor to a d-axis current and a q-axis current, finds voltage command values such that a d-axis current and a q-axis current approach a d-axis current command value and a q-axis current command value, and turns each of a plurality of switching elements included in an inverter circuit on and off by using drive signals in accordance with a result of comparison between the voltage command values and a carrier wave, in other words, a control device that controls the driving of the electric motor by vector control.

As another control device for an electric motor, there is a control device that corrects the voltage command values by using the polarities of the alternating currents during dead time in which switching elements connected to each other in series are prohibited from being simultaneously turned on.

However, in the abovementioned other control device, when the alternating currents become close to zero, the polarities of the alternating currents are frequently switched due to a high-frequency current included in the alternating currents. Therefore, there is a fear that the correction accuracy of the voltage command values during the dead time decreases and that the controllability of the driving of the electric motor decreases.

Thus, as a yet another control device, there is a control device that causes the d-axis current command value to be relatively great. By causing the d-axis current command value to be relatively great as above, the amplitude values of the alternating currents increase, and the inclination of the alternating currents close to zero increases. As a result, a case where the polarities of the alternating currents are frequently switched due to the high-frequency current may be suppressed, and hence the decrease of the correction accuracy of the voltage command values during the dead time may be suppressed. As a related technology, there is Patent Literature 1.

CITATION LIST

Patent Literature

Patent Literature 1: Japanese Patent Application Publication No. 2015-126641

SUMMARY OF INVENTION

Technical Problem

However, in a control device that causes the d-axis current command value to be relatively great, the amplitude values of the alternating currents increase, and hence there is a concern over loss due to the increase of current that flows through the switching elements and the like.

Thus, an object according to one aspect of the present disclosure is to provide a control device for an electric motor capable of suppressing a case where controllability of the driving of an electric motor decreases due to a high-frequency current included in an alternating current that flows through the electric motor and capable of reducing loss due to the increase of current that flows through a switching element and the like.

Solution to Problem

A control device for an electric motor that is one form according to the present disclosure includes: an inverter circuit that drives an electric motor as a result of a plurality of switching elements being turned on and off; and a control circuit that converts an alternating current that flows through the electric motor to a d-axis current and a q-axis current, finds a voltage command value such that the d-axis current and the q-axis current approach a d-axis current command value and a q-axis current command value, and turns the plurality of switching elements on and off by using a drive signal corresponding to a result of comparison between the voltage command value and a carrier wave.

The control circuit corrects the voltage command value by using a polarity of the alternating current during dead time in which the switching elements connected to each other in series are prohibited from being simultaneously turned on, and causes the d-axis current command value in a certain length of time before and after the alternating current reaches zero to be greater than the d-axis current command value in a length of time other than the certain length of time.

As a result, the inclination of the alternating current in the certain length of time becomes relatively great, and hence a case where the polarity of the alternating current is frequently switched during the dead time within the certain length of time may be suppressed. Thus, the correction accuracy of the voltage command value may be improved, and the decrease of the controllability of the driving of the electric motor may be suppressed.

A d-axis current command value Id* is caused to be relatively great only in the certain length of time out of one cycle of the rotor of the electric motor. Therefore, as compared to a case where the d-axis current command value Id* is caused to be relatively great in the entire length of time out of one cycle of the rotor, the current that flows through the switching elements and the like may be suppressed, and loss caused by the increase of current that flows through the switching elements and the like may be reduced.

The control circuit causes a frequency of the carrier wave in the certain length of time to be greater than a frequency of the carrier wave in the length of time other than the certain length of time.

As a result, in the dead time within the certain length of time, the amplitude value of the high-frequency current included in the alternating current may be caused to be small, and hence a case where the polarity of the alternating current is frequently switched may be further suppressed. Thus, the correction accuracy of the voltage command value may be further improved, and a case where the controllability of the driving of the electric motor decreases may be further suppressed.

The d-axis current command value Id* and a frequency f of the carrier wave are only caused to be relatively great in the certain length of time out of one cycle of the rotor of the electric motor M. Therefore, as compared to a case where the d-axis current command value Id* and the frequency f of the carrier wave are caused to be relatively great in the entire length of time out of one cycle of the rotor, the current that flows through the switching elements and the like and the number of times of switching of the switching elements per unit time may be suppressed, and loss caused by the increase of the current that flows through the switching element and the like and loss caused by the increase of number of times of switching of the switching elements may be reduced.

Advantageous Effects of Invention

According to the present disclosure, a case where the controllability of the driving of the electric motor decreases due to the high-frequency current included in the alternating current that flows through the electric motor is suppressible and the loss due to the increase of the current that flows through the switching element is reducible.

DESCRIPTION OF EMBODIMENTS

Embodiments are described in detail below with reference to the drawings.

Figure 1:
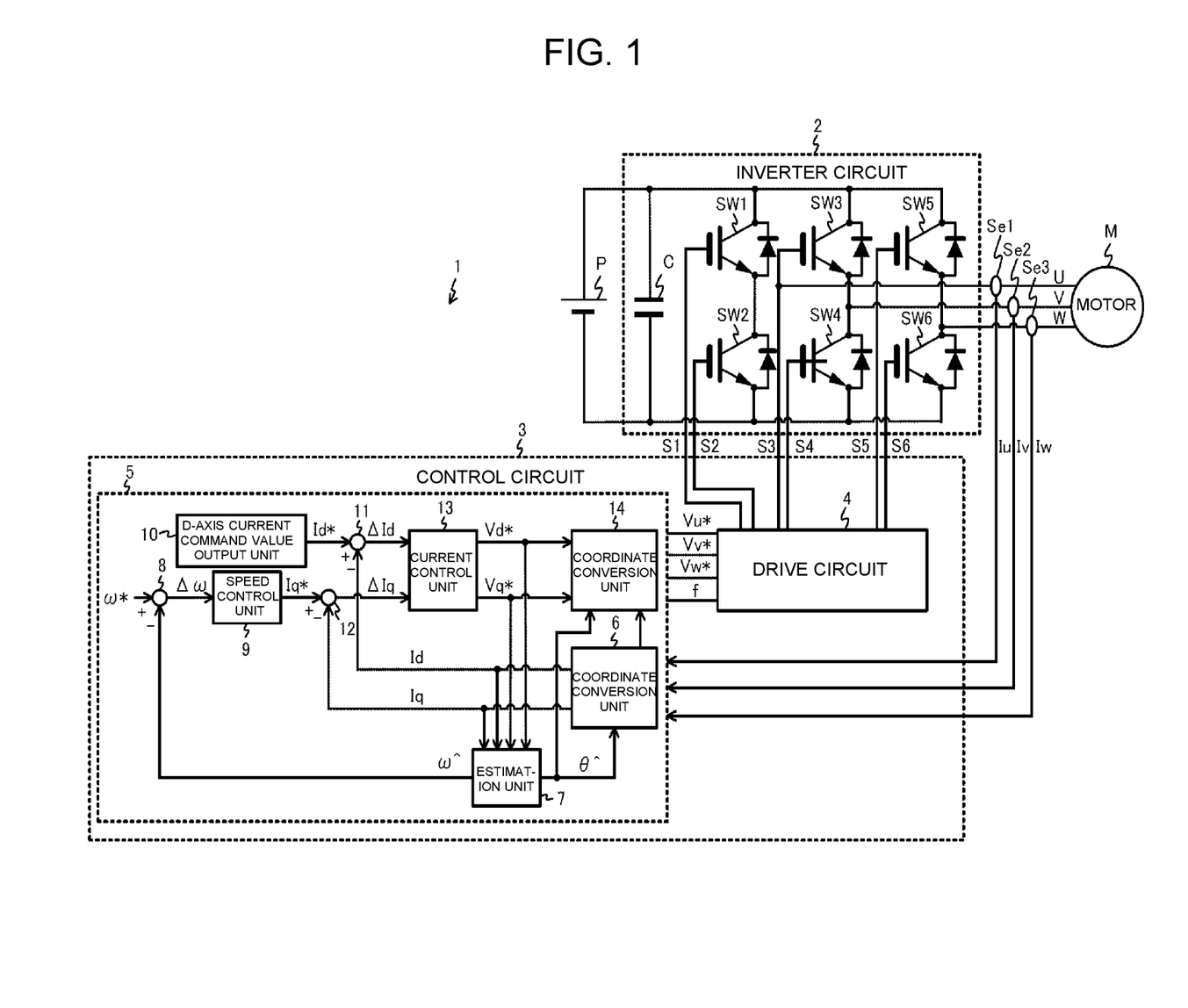
FIG. 1 is a diagram illustrating one example of a control device for an electric motor of an embodiment.

FIG. 1 is a diagram illustrating one example of a control device for an electric motor of an embodiment.

A control device 1 illustrated in FIG. 1 controls the driving of an electric motor M mounted on a vehicle such as an electric forklift and a plug-in hybrid car, for example, and includes an inverter circuit 2, a control circuit 3, and current sensors Se1 to Se3.

The inverter circuit 2 drives the electric motor M by DC power supplied from a DC power supply P and includes a capacitor C and switching elements SW1 to SW6 (for example, insulated gate bipolar transistors (IGBTs)). In other words, one end of the capacitor C is connected to a positive electrode terminal of the DC power supply P and each of collector terminals of the switching elements SW1, SW3, SW5, and another end of the capacitor C is connected to a negative electrode terminal of the DC power supply P and each of emitter terminals of the switching elements SW2, SW4, SW6. A connecting point between the emitter terminal of the switching element SW1 and the collector terminal of the switching element SW2 is connected to an input terminal of a U-phase of the electric motor M via the current sensor Se1. A connecting point between the emitter terminal of the switching element SW3 and the collector terminal of the switching element SW4 is connected to an input terminal of a V-phase of the electric motor M via the current sensor Se2. A connecting point between the emitter terminal of the switching element SW5 and the collector terminal of the switching element SW6 is connected to an input terminal of a W-phase of the electric motor M via the current sensor Se3.

The capacitor C smooths a voltage Vin output from the DC power supply P and input to the inverter circuit 2.

The switching element SW1 is turned on or off on the basis of a drive signal S1 output from the control circuit 3. The switching element SW2 is turned on or off on the basis of a drive signal S2 output from the control circuit 3. The switching element SW3 is turned on or off on the basis of a drive signal S3 output from the control circuit 3. The switching element SW4 is turned on or off on the basis of a drive signal S4 output from the control circuit 3. The switching element SW5 is turned on or off on the basis of a drive signal S5 output from the control circuit 3. The switching element SW6 is turned on or off on the basis of a drive signal S6 output from the control circuit 3. By turning each of the switching elements SW1 to SW6 on or off, the DC power output from the DC power supply P is converted into three AC power of which phases are different from each other by 120 degrees. Each of the AC power is input to input terminals of the U-phase, the V-phase, and the W-phase of the electric motor M, and a rotor of the electric motor M rotates.

The current sensors Se1 to Se3 are configured by hall elements, shunt resistors, and the like. The current sensor Se1 detects an alternating current Iu flowing through the U-phase of the electric motor M and outputs the alternating current Iu to the control circuit 3. The current sensor Se2 detects an alternating current Iv flowing through the V-phase of the electric motor M and outputs the alternating current Iv to the control circuit 3. The current sensor Se3 detects an alternating current Iw flowing through the W-phase of the electric motor M and outputs the alternating current Iw to the control circuit 3. When the alternating currents Iu, Iv, Iw are not particularly distinguished from each other, the alternating currents Iu, Iv, Iw are simply referred to as an alternating current I.

The control circuit 3 includes a drive circuit 4 and an arithmetic unit 5.

The drive circuit 4 is configured by an integrated circuit (IC) and the like, compares voltage command values Vu*, Vv*, Vw* output from the arithmetic unit 5 and carrier waves (a triangle wave, a sawtooth wave, a reverse sawtooth wave, or the like) with each other, and outputs the drive signals S1 to S6 in accordance with the comparison results to respective gate terminals of the switching elements SW1 to SW6. For example, the drive circuit 4 outputs the drive signal S1 at a high level and outputs the drive signal S2 at a low level when the voltage command value Vu* is equal to or greater than the carrier wave, and outputs the drive signal S1 at a low level and the drive signal S2 at a high level when the voltage command value Vu* is smaller than the carrier wave. The drive circuit 4 outputs the drive signal S3 at a high level and outputs the drive signal S4 at a low level when the voltage command value Vv* is equal to or greater than the carrier wave, and outputs the drive signal S3 at a low level and the drive signal S4 at a high level when the voltage command value Vv* is smaller than the carrier wave. The drive circuit 4 outputs the drive signal S5 at a high level and outputs the drive signal S6 at a low level when the voltage command value Vw* is equal to or greater than the carrier wave, and outputs the drive signal S5 at a low level and the drive signal S6 at a high level when the voltage command value Vw* is smaller than the carrier wave.

The arithmetic unit 5 is configured by a microcomputer and the like and includes a coordinate conversion unit 6, an estimation unit 7, a subtraction unit 8, a speed control unit 9, a d-axis current command value output unit 10, subtraction units 11, 12, a current control unit 13, and a coordinate conversion unit 14. For example, by executing a program stored in a storage unit (not shown) by the microcomputer, the coordinate conversion unit 6, the estimation unit 7, the subtraction unit 8, the speed control unit 9, the d-axis current command value output unit 10, the subtraction units 11, 12, the current control unit 13, and the coordinate conversion unit 14 are realized.

The coordinate conversion unit 6 converts the alternating currents Iu, Iv, Iw detected by the current sensors Se1 to Se3 to a d-axis current Id and a q-axis current Iq with use of a position θ^ output from the estimation unit 7.

For example, the coordinate conversion unit 6 converts the currents Iu, Iv, Iw to the d-axis current Id and the q-axis current Iq with use of a conversion matrix C1 expressed in Expression 1 below.

[Math. 1]

$$C1 = \sqrt{\frac{2}{3}} \begin{bmatrix} \cos\theta^{\wedge} & \cos(\theta^{\wedge} - 2\pi/3) & \cos(\theta^{\wedge} + 2\pi/3) \\ -\sin\theta^{\wedge} & -\sin(\theta^{\wedge} - 2\pi/3) & -\sin(\theta^{\wedge} + 2\pi/3) \end{bmatrix} \quad \text{Expression 1}$$

The estimation unit 7 estimates the position θ^ and a rotational speed (number of rotations) ω^ of the rotor of the electric motor M with use of a d-axis voltage command value Vd* and a q-axis voltage command value Vq* output from the current control unit 13 and the d-axis current Id and the q-axis current Iq output from the coordinate conversion unit 6.

For example, the estimation unit 7 computes a back electromotive force ed^ and a back electromotive force eq^ by Expression 2 and Expression 3 below. A resistance included in the electric motor M is represented by R, and an inductance of a coil included in the electric motor M is represented by L.

$$ed^{\wedge} = Vd^{*} - R \times Id + \omega^{\wedge} \times L \times Id \quad \text{Expression 2}$$

$$eq^{\wedge} = Vq^{*} - R \times Iq + \omega^{\wedge} \times L \times Iq \quad \text{Expression 3}$$

Next, the estimation unit 7 computes an error θe^ by Expression 4 below.

$$\theta e^{\wedge} = \tan^{-1}(ed^{\wedge}/eq^{\wedge}) \quad \text{Expression 4}$$

Next, the estimation unit 7 finds the rotational speed ω^ with which the error θe^ becomes zero in Expression 5 below. A constant of a proportional term of proportional integral (PI) control is represented by Kp, and a constant of an integral term of the PI control is represented by Ki.

$$\omega^{\wedge} = Kp \times \theta e^{\wedge} + Ki \times \int(\theta e^{\wedge})dt \quad \text{Expression 5}$$

The estimation unit 7 computes the position θ^ by Expression 6 below. A Laplace operator is represented by s.

$$\theta^{\wedge} = (1/s) \times \omega^{\wedge} \quad \text{Expression 6}$$

The subtraction unit 8 computes a difference Δω between a rotational speed command value ω* input from the outside and the rotational speed ω^ output from the estimation unit 7.

The speed control unit 9 converts the difference Δω output from the subtraction unit 8 to a q-axis current command value Iq*.

For example, the speed control unit 9 finds the q-axis current command value Iq* with which the difference Δω becomes zero in Expression 7 below.

$$Iq^{*} = Kp \times \Delta\omega + Ki \times \int(\Delta\omega)dt \quad \text{Expression 7}$$

The d-axis current command value output unit 10 outputs a predetermined d-axis current command value Id*.

The subtraction unit 11 calculates a difference ΔId between the d-axis current command value Id* output from the d-axis current command value output unit 10 and the d-axis current Id output from the coordinate conversion unit 6.

The subtraction unit 12 calculates a difference ΔIq between the q-axis current command value Iq* output from the speed control unit 9 and the q-axis current Iq output from the coordinate conversion unit 6.

The current control unit 13 converts the difference ΔId output from the subtraction unit 11 and the difference ΔIq output from the subtraction unit 12 to the d-axis voltage command value Vd* and the q-axis voltage command value Vq*.

For example, the current control unit 13 calculates the d-axis voltage command value Vd* with use of Expression 8 below and calculates the q-axis voltage command value Vq* with use of Expression 9 below. A q-axis inductance of the coil included in the electric motor M is represented by Lq, a d-axis inductance of the coil included in the electric motor M is represented by Ld, and an induced voltage constant is represented by Ke.

$$Vd^{*} = Kp \times \Delta Id + Ki \times \int(\times Id)dt - \omega Lq Iq \quad \text{Expression 8}$$

$$Vq^{*} = Kp \times \Delta Iq + Ki \times \int(\Delta Iq)dt + \omega Ld Id + \omega Ke \quad \text{Expression 9}$$

The coordinate conversion unit 14 converts the d-axis voltage command value Vd* and the q-axis voltage command value Vq* to the voltage command values Vu*, Vv*, Vw* with use of the position θ^ output from the estimation unit 7.

For example, the coordinate conversion unit 14 converts the d-axis voltage command value Vd* and the q-axis voltage command value Vq* to the voltage command values Vu*, Vv*, Vw* with use of a conversion matrix C2 expressed in Expression 10 below.

[Math. 2]

$$C2 = \sqrt{\frac{2}{3}} \begin{bmatrix} \cos\theta^{\wedge} & -\sin\theta^{\wedge} \\ \cos(\theta^{\wedge} - 2\pi/3) & -\sin(\theta^{\wedge} - 2\pi/3) \\ \cos(\theta^{\wedge} + 2\pi/3) & -\sin(\theta^{\wedge} + 2\pi/3) \end{bmatrix} \quad \text{Expression 10}$$

Alternatively, the coordinate conversion unit 14 sets a calculation result of Expression 11 below to be a phase angle δ.

$$\delta = \tan^{-1}(-Vq^{*}/Vd^{*}) \quad \text{Expression 11}$$

Next, the coordinate conversion unit 14 sets a result of addition of the phase angle δ and the position θ^ to be a target position θv.

Then, the coordinate conversion unit 14 finds voltage command values Vu*, Vv*, Vw* corresponding to the target position θv with reference to information indicating a correspondence relationship between the target position θv and the voltage command values Vu*, Vv*, Vw* stored in a storage unit (not shown) in advance.

When the target position θv is in dead time, the coordinate conversion unit 14 corrects the voltage command value Vu* in accordance with the polarity of the alternating current Iu, corrects the voltage command value Vv* in accordance with the polarity of the alternating current Iv, and corrects the voltage command value Vw* in accordance with the polarity of the alternating current Iw such that the rotational speed ω^ reaches a desired rotational speed or the q-axis current Iq (the torque of the electric motor M) reaches the desired q-axis current Iq. The dead time is a length of time in which the switching elements SW1, SW2 connected to each other in series are prohibited from being simultaneously turned on, a length of time in which the switching elements SW3, SW4 connected to each other in series are prohibited from being simultaneously turned on, and a length of time in which the switching elements SW5, SW6 connected to each other in series are prohibited from being simultaneously turned on. Specifically, the coordinate conversion unit 14 sets the drive signals S1, S2 to a low level, sets the drive signals S3, S4 to a low level, and sets the drive signals S5, S6 to a low level during the dead time.

The coordinate conversion unit 14 outputs a frequency f of the carrier wave to the drive circuit 4. The drive circuit 4 outputs the drive signals S1 to S6 in accordance with a result of comparison between the voltage command values Vu*, Vv*, Vw* output from the coordinate conversion unit 14 and the carrier wave of the frequency f output from the coordinate conversion unit 14.

First Embodiment

The control circuit 3 in a first embodiment causes the d-axis current command value Id* in a certain length of time Tu1 before and after the alternating current Iu reaches zero to be greater than the d-axis current command value Id* in a length of time Tu2 other than the certain length of time Tu1. The control circuit 3 in the first embodiment causes the d-axis current command value Id* in a certain length of time Tv1 before and after the alternating current Iv reaches zero to be greater than the d-axis current command value Id* in a length of time Tv2 other than the certain length of time Tv1. The control circuit 3 in the first embodiment causes the d-axis current command value Id* in a certain length of time Tw1 before and after the alternating current Iw reaches zero to be greater than the d-axis current command value Id* in a length of time Tw2 other than the certain length of time Tw1. When the certain length of time Tu1, Tv1, Tw1 are not particularly distinguished from each other, the certain length of time Tu1, Tv1, Tw1 are simply referred to as a certain length of time T1. When the length of time Tu2, Tv2, Tw2 are not particularly distinguished from each other, the length of time Tu2, Tv2, Tw2 are simply referred to as a certain length of time T2.

Figure 2:
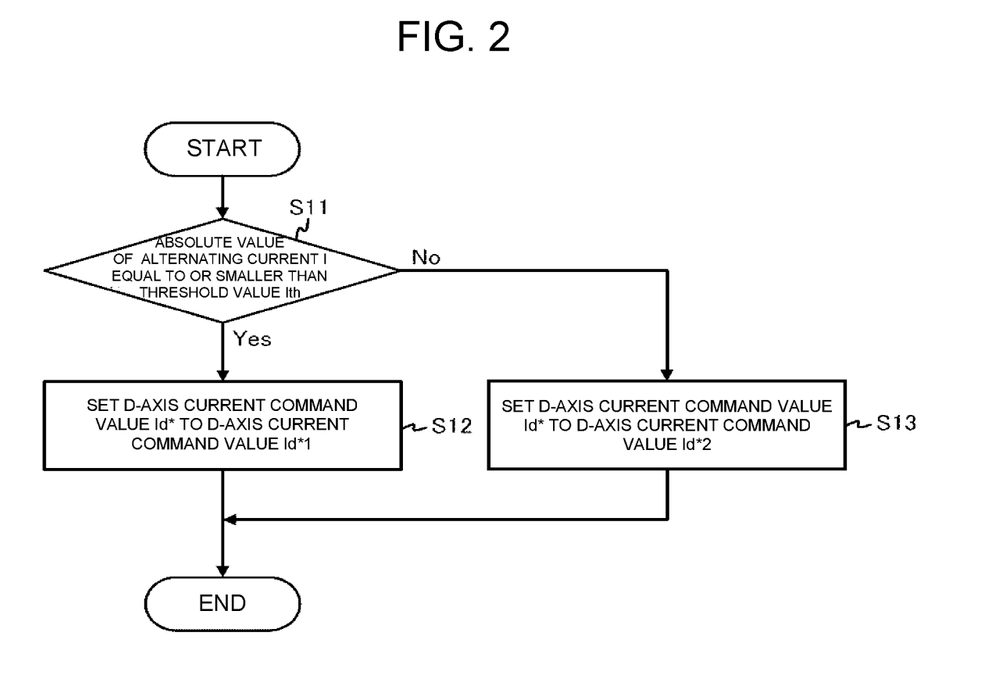
FIG. 2 is a flowchart illustrating one example of an operation of a control circuit in a first embodiment.

FIG. 2 is a flowchart illustrating one example of an operation of the control circuit 3 in the first embodiment.

When an absolute value of the alternating current I is equal to or smaller than a threshold value Ith (Step S11: Yes), the control circuit 3 sets the d-axis current command value Id* to a d-axis current command value Id*1 in the d-axis current command value output unit 10 (Step S12). The threshold value Ith is preset on the basis of the alternating current I when a length of time in which the polarity of the alternating current I is frequently switched becomes the longest. The length of time in which the polarity of the alternating current I is frequently switched is a length of time in which a state where the number of times the polarity of the alternating current I is switched per unit time is equal to or greater than a predetermined value continues.

Meanwhile, when the absolute value of the alternating current I is greater than the threshold value Ith (Step S11: No), the control circuit 3 sets the d-axis current command value Id* to a d-axis current command value Id*2 in the d-axis current command value output unit 10 (Step S13).

The d-axis current command value Id*1>the d-axis current command value Id*2 is satisfied.

As a result, the d-axis current command value Id* in the length of time in which the absolute value of the alternating current I is equal to or smaller than the threshold value Ith may be caused to be greater than the d-axis current command value Id* in the length of time in which the absolute value of the alternating current I is greater than the threshold value Ith. In other words, the d-axis current command value Id* in the certain length of time T1 before and after the alternating current I reaches zero may be caused to be greater than the d-axis current command value Id* in the length of time T2 other than the certain length of time T1.

Figure 3:
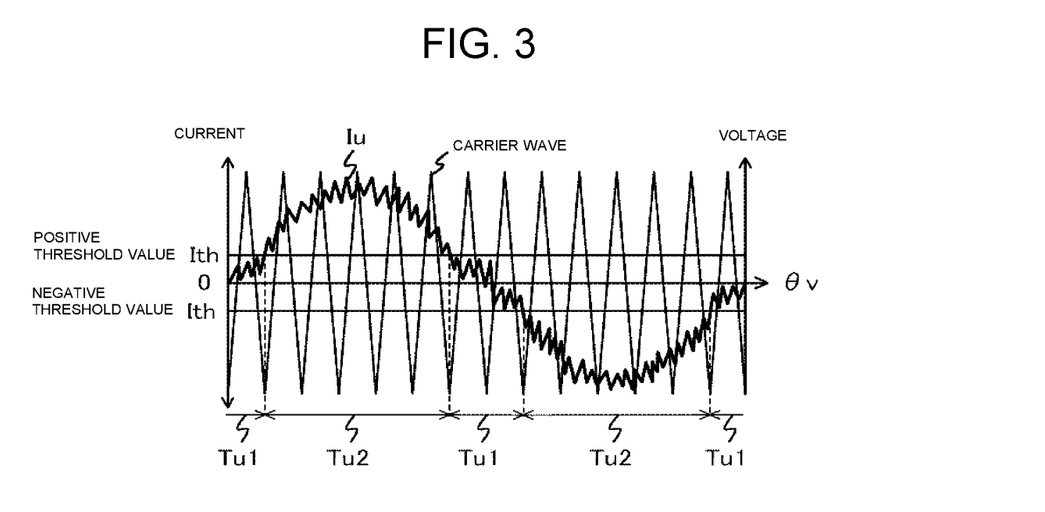
FIG. 3 is a diagram showing a relationship between an alternating current, a threshold value, and a carrier wave in the first embodiment.

FIG. 3 is a diagram showing a relationship between the alternating current Iu, the threshold value Ith, and the carrier wave in the first embodiment. The horizontal axis of a two-dimensional coordinate shown in FIG. 3 indicates the target position θv, and the vertical axis thereof indicates the current or the voltage.

The control circuit 3 sets the d-axis current command value Id* in a length of time (the certain length of time Tu1) in which the positive alternating current Iu is equal to or smaller than the positive threshold value Ith or the negative alternating current Iu is equal to or smaller than the negative threshold value Ith to the d-axis current command value Id*1, and sets the d-axis current command value Id* in a length of time (the length of time Tu2) in which the positive alternating current Iu is greater than the positive threshold value Ith or the negative alternating current Iu is greater than the negative threshold value Ith to the d-axis current command value Id*2.

As a result, the d-axis current command value Id* in the certain length of time Tu1 may be caused to be greater than the d-axis current command value Id* in the length of time Tu2.

Similarly, the control circuit 3 sets the d-axis current command value Id* in a length of time (the certain length of time Tv1) in which the positive alternating current Iv is equal to or smaller than the positive threshold value Ith or the negative alternating current Iv is equal to or smaller than the negative threshold value Ith to the d-axis current command value Id*1, and sets the d-axis current command value Id* in a length of time (the length of time Tv2) in which the positive alternating current Iv is greater than the positive threshold value Ith or the negative alternating current Iv is greater than the negative threshold value Ith to the d-axis current command value Id*2.

As a result, the d-axis current command value Id* in the certain length of time Tv1 may be caused to be greater than the d-axis current command value Id* in the length of time Tv2.

The control circuit 3 sets the d-axis current command value Id* in a length of time (the certain length of time Tw1) in which the positive alternating current Iw is equal to or smaller than the positive threshold value Ith or the negative alternating current Iw is equal to or smaller than the negative threshold value Ith to the d-axis current command value Id*1, and sets the d-axis current command value Id* in a length of time (the length of time Tw2) in which the positive alternating current Iw is greater than the positive threshold value Ith or the negative alternating current Iw is greater than the negative threshold value Ith to the d-axis current command value Id*2.

As a result, the d-axis current command value Id* in the certain length of time Tw1 may be caused to be greater than the d-axis current command value Id* in the length of time Tw2.

In general, the amplitude value of the alternating current I increases as the d-axis current command value Id* increases.

As a result, the inclination of the alternating current I in the certain length of time T1 before and after the alternating current I reaches zero becomes relatively great, and hence a case where the polarity of the alternating current I is frequently switched due to the high-frequency current may be suppressed.

As above, the control device 1 of the first embodiment has a configuration that causes the d-axis current command value Id* in the certain length of time T1 before and after the alternating current I reaches zero to be greater than the d-axis current command value Id* in the length of time T2 other than the certain length of time T1. Therefore, during the dead time in the certain length of time T1, the inclination of the alternating current I may be caused to be relatively great, and a case where the polarity of the alternating current I is frequently switched due to high-frequency current may be suppressed. Thus, the correction accuracy of the voltage command values Vu*, Vv*, Vw* during the dead time may be improved, and the decrease of the controllability of the driving of the electric motor M may be suppressed.

The control device 1 of the first embodiment has a configuration that causes the d-axis current command value Id* to be relatively great only in the certain length of time T1 out of one cycle of the rotor of the electric motor M. Therefore, as compared to a case where the d-axis current command value Id* is caused to be relatively great in the entire length of time out of one cycle of the rotor, the current that flows through the switching elements SW1 to SW6 and the like may be suppressed, and loss caused by the increase of current that flows through the switching elements SW1 to SW6 and the like may be reduced.

Second Embodiment

The control circuit 3 in a second embodiment causes the d-axis current command value Id* in a certain length of time Tu1' before and after the alternating current Iu reaches zero to be greater than the d-axis current command value Id* in a length of time Tu2' other than the certain length of time Tu1'. The control circuit 3 in the second embodiment causes the d-axis current command value Id* in a certain length of time Tv1' before and after the alternating current Iv reaches zero to be greater than the d-axis current command value Id* in a length of time Tv2' other than the certain length of time Tv1'. In addition, the control circuit 3 in the second embodiment causes the d-axis current command value Id* in a certain length of time Tw1' before and after the alternating current Iw reaches zero to be greater than the d-axis current command value Id* in a length of time Tw2' other than the certain length of time Tw1'. When the certain length of time Tu1', Tv1', Tw1' are not particularly distinguished from each other, the certain length of time Tu1', Tv1', Tw1' are simply referred to as a certain length of time T1'. When the length of time Tu2', Tv2', Tw2' are not particularly distinguished from each other, the length of time Tu2', Tv2', Tw2' are simply referred to as a certain length of time T2'.

The control circuit 3 in the second embodiment causes the frequency f of the carrier wave in the certain length of time Tu1' to be greater than the frequency f of the carrier wave in the length of time Tu2'. The control circuit 3 in the second embodiment causes the frequency f of the carrier wave in the certain length of time Tv1' to be greater than the frequency f of the carrier wave in the length of time Tv2'. The control circuit 3 in the second embodiment causes the frequency f of the carrier wave in the certain length of time Tw1' to be greater than the frequency f of the carrier wave in the length of time Tw2'.

Figure 4:
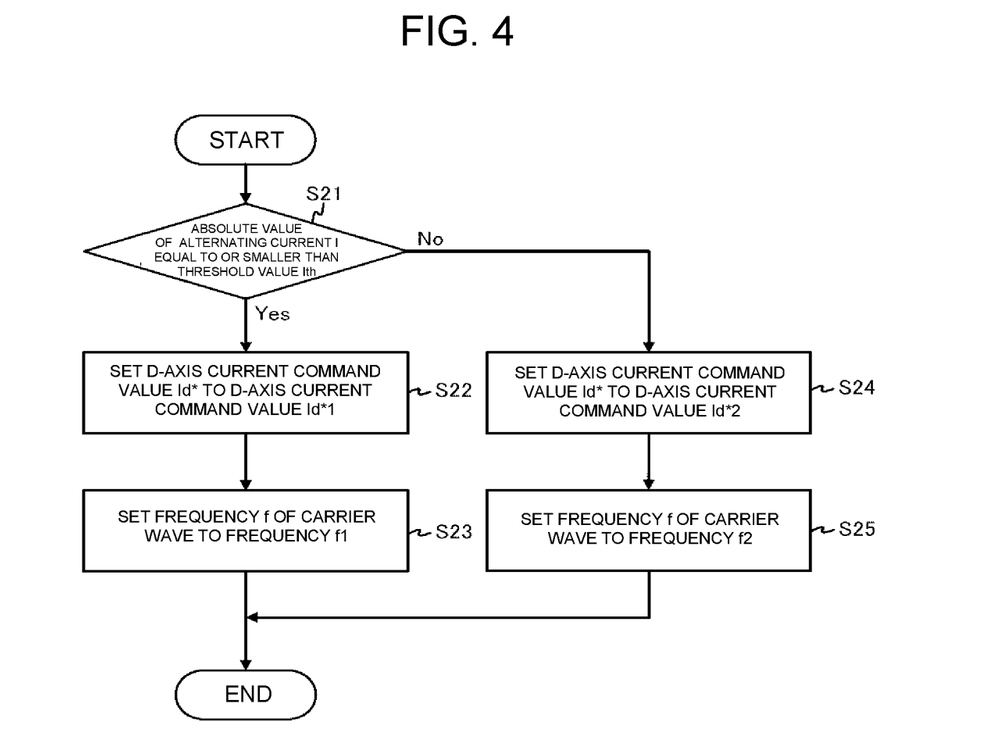
FIG. 4 is a flowchart illustrating one example of an operation of a control circuit in a second embodiment.

FIG. 4 is a flowchart illustrating one example of an operation of the control circuit 3 in the second embodiment.

When an absolute value of the alternating current I is equal to or smaller than the threshold value Ith (Step S21: Yes), the control circuit 3 sets the d-axis current command value Id* to the d-axis current command value Id*1 in the d-axis current command value output unit 10 (Step S22), and sets the frequency f of the carrier wave to the frequency f1 in the coordinate conversion unit 14 (Step S23).

Meanwhile, when the absolute value of the alternating current I is greater than the threshold value Ith (Step S21: No), the control circuit 3 sets the d-axis current command value Id* to a d-axis current command value Id*2 in the d-axis current command value output unit 10 (Step S24), and sets the frequency f of the carrier wave to the frequency f2 in the coordinate conversion unit 14 (Step S25). The d-axis current command value Id*1>the d-axis current command value Id*2 is satisfied. The frequency f1>the frequency f2 is satisfied, and, for example, the frequency f1: the frequency f2=2:1 or the frequency f1: the frequency f2=4:1 is satisfied.

As a result, the d-axis current command value Id* in the length of time in which the absolute value of the alternating current I is equal to or smaller than the threshold value Ith may be caused to be greater than the d-axis current command value Id* in the length of time in which the absolute value of the alternating current I is greater than the threshold value Ith, and the frequency f of the carrier wave in the length of time in which the absolute value of the alternating current I is equal to or smaller than the threshold value Ith may be caused to be greater than the frequency f of the carrier wave in the length of time in which the absolute value of the alternating current I is greater than the threshold value Ith. In other words, the d-axis current command value Id* in the certain length of time T1' before and after the alternating current I reaches zero may be caused to be greater than the d-axis current command value Id* in the length of time T2' other than the certain length of time T1', and the frequency f of the carrier wave in the certain length of time T1' may be caused to be greater than the frequency f of the carrier wave in the length of time T2' other than the certain length of time T1'.

Figure 5:
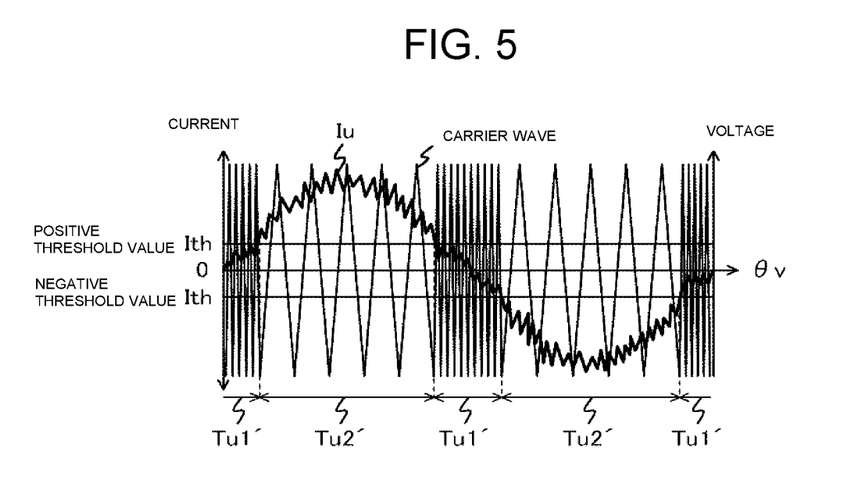
FIG. 5 is a diagram showing a relationship between an alternating current, a threshold value, and a carrier wave in the second embodiment.

FIG. 5 is a diagram showing a relationship between the alternating current Iu, the threshold value Ith, and the carrier wave in the second embodiment. The horizontal axis of a two-dimensional coordinate shown in FIG. 5 indicates the target position θv, and the vertical axis thereof indicates the current or the voltage.

The control circuit 3 in the second embodiment sets the d-axis current command value Id* in a length of time (the certain length of time Tu1') in which the positive alternating current Iu is equal to or smaller than the positive threshold value Ith or the negative alternating current Iu is equal to or smaller than the negative threshold value Ith to the d-axis current command value Id*1, and sets the d-axis current command value Id* in a length of time (the length of time Tu2') in which the positive alternating current Iu is greater than the positive threshold value Ith or the negative alternating current Iu is greater than the negative threshold value Ith to the d-axis current command value Id*2.

The control circuit 3 in the second embodiment sets the frequency f of the carrier wave in a length of time (the certain length of time Tu1') in which the positive alternating current Iu is equal to or smaller than the positive threshold value Ith or the negative alternating current Iu is equal to or smaller than the negative threshold value Ith to the frequency f1, and sets the frequency f of the carrier wave in a length of time (the length of time Tu2') in which the positive alternating current Iu is greater than the positive threshold value Ith or the negative alternating current Iu is greater than the negative threshold value Ith to the frequency f2.

As a result, the d-axis current command value Id* in the certain length of time Tu1' may be caused to be greater than the d-axis current command value Id* in the length of time Tu2', and the frequency f of the carrier wave in the certain length of time Tu1' may be caused to be greater than the frequency f of the carrier wave in the length of time Tu2'.

Similarly, the control circuit 3 in the second embodiment sets the d-axis current command value Id* in a length of time (the certain length of time Tv1') in which the positive alternating current Iv is equal to or smaller than the positive threshold value Ith or the negative alternating current Iv is equal to or smaller than the negative threshold value Ith to the d-axis current command value Id*1, and sets the d-axis current command value Id* in a length of time (the length of time Tv2') in which the positive alternating current Iv is greater than the positive threshold value Ith or the negative alternating current Iv is greater than the negative threshold value Ith to the d-axis current command value Id*2.

Furthermore, the control circuit 3 in the second embodiment sets the frequency f of the carrier wave in a length of time (the certain length of time Tv1') in which the positive alternating current Iv is equal to or smaller than the positive threshold value Ith or the negative alternating current Iv is equal to or smaller than the negative threshold value Ith to the frequency f1, and sets the frequency f of the carrier wave in a length of time (the length of time Tv2') in which the positive alternating current Iv is greater than the positive threshold value Ith or the negative alternating current Iv is greater than the negative threshold value Ith to the frequency f2.

As a result, the d-axis current command value Id* in the certain length of time Tv1' may be caused to be greater than the d-axis current command value Id* in the length of time Tv2', and the frequency f of the carrier wave in the certain length of time Tv1' may be caused to be greater than the frequency f of the carrier wave in the length of time Tv2'.

The control circuit 3 in the second embodiment sets the d-axis current command value Id* in a length of time (the certain length of time Tw1') in which the positive alternating current Iw is equal to or smaller than the positive threshold value Ith or the negative alternating current Iw is equal to or smaller than the negative threshold value Ith to the d-axis current command value Id*1, and sets the d-axis current command value Id* in a length of time (the length of time Tw2') in which the positive alternating current Iw is greater than the positive threshold value Ith or the negative alternating current Iw is greater than the negative threshold value Ith to the d-axis current command value Id*2.

The control circuit 3 in the second embodiment sets the frequency f of the carrier wave in a length of time (the certain length of time Tw1') in which the positive alternating current Iw is equal to or smaller than the positive threshold value Ith or the negative alternating current Iw is equal to or smaller than the negative threshold value Ith to the frequency f1, and sets the frequency f of the carrier wave in a length of time (the length of time Tw2') in which the positive alternating current Iw is greater than the positive threshold value Ith or the negative alternating current Iw is greater than the negative threshold value Ith to the frequency f2.

As a result, the d-axis current command value Id* in the certain length of time Tw1' may be caused to be greater than the d-axis current command value Id* in the length of time Tw2', and the frequency f of the carrier wave in the certain length of time Tw1' may be caused to be greater than the frequency f of the carrier wave in the length of time Tw2'.

In general, the amplitude value of the high-frequency current included in the alternating current I decreases as the frequency f of the carrier wave increases.

Therefore, in the certain length of time T1' before and after the alternating current I reaches zero, the amplitude value of the high-frequency current included in the alternating current I may be caused to be small as compared to the length of time T2' other than the certain length of time T1'. Thus, a case where the polarity of the alternating current I is frequently switched in the certain length of time T1' may be suppressed.

As above, in the control device 1 of the second embodiment, in the certain length of time T1', not only the d-axis current command value Id* but also the frequency f of the carrier wave becomes relatively great. Thus, a case where the polarity of the alternating current I is frequently switched may be further suppressed. As a result, the correction accuracy of the voltage command values Vu*, Vv*, Vw* may be further improved, and the decrease of the controllability of the driving of the electric motor M may be further suppressed.

The control device 1 of the second embodiment has a configuration that causes the d-axis current command value Id* and the frequency f of the carrier wave to be relatively great only in the certain length of time T1' out of one cycle of the rotor of the electric motor M. Therefore, as compared to a case where the d-axis current command value Id* and the frequency f of the carrier wave are caused to be relatively great in the entire length of time out of one cycle of the rotor, the current that flows through the switching elements SW1 to SW6 and the like and the number of times of switching of the switching elements SW1 to SW6 per unit time may be suppressed, and loss due to the increase of the current that flows through the switching elements SW1 to SW6 and loss due to the increase of the number of times of switching of the switching elements SW1 to SW6 may be reduced.

The present disclosure is not limited to the embodiments above, and various improvements and changes may be made without departing from the gist of the present disclosure.

The control device 1 of the abovementioned embodiments has a configuration of outputting the position $\theta\hat{}$ estimated by the estimation unit 7 to the coordinate conversion units 6, 14, but may be configured to output a position $\theta$ of the rotor of the electric motor M detected by a detector such as an encoder or a resolver to the coordinate conversion units 6, 14 instead of the position $\theta\hat{}$.

The control device 1 of the abovementioned embodiments has a configuration of including the current sensors Se1 to Se3 but may be configured to include two current sensors out of the current sensors Se1 to Se3. When such configuration is employed, the control device 1 finds the remaining alternating currents with use of the two alternating currents detected by the two current sensors.

REFERENCE SIGNS LIST 1 control device
2 inverter circuit
3 control circuit
4 drive circuit
5 arithmetic unit
6 coordinate conversion unit
7 estimation unit 8 subtraction unit
9 speed control unit
10 d-axis current command value output unit
11 subtraction unit
12 subtraction unit
13 current control unit
14 coordinate conversion unit

The invention claimed is:

1. A control device for an electric motor, the control device comprising:
   an inverter circuit that drives the electric motor with a plurality of switching elements turned on and off; and
   a control circuit that converts an alternating current that flows through the electric motor to a d-axis current and a q-axis current, finds a voltage command value such that the d-axis current and the q-axis current approach a d-axis current command value and a q-axis current command value, respectively, and turns the plurality of switching elements on and off by using a drive signal in accordance with a result of comparison between the voltage command value and a carrier wave,
   wherein the control circuit corrects the voltage command value by using a polarity of the alternating current during dead time in which the switching elements connected to each other in series are prohibited from being simultaneously turned on, and causes the d-axis current command value in a certain length of time before and after the alternating current reaches zero to be greater than the d-axis current command value in a length of time other than the certain length of time.

2. The control device for the electric motor according to claim 1, wherein the control circuit causes a frequency of the carrier wave in the certain length of time to be greater than a frequency of the carrier wave in the length of time other than the certain length of time.

* * * * *